United States Patent [19]
Cunningham

[11] Patent Number: 6,079,789
[45] Date of Patent: Jun. 27, 2000

[54] SAFETY DEVICE AND METHOD FOR REDUCING THE LIKELIHOOD OF TIRE AND RIM MIS-MATCH

[76] Inventor: Charles L. Cunningham, 6001 Robert E. Lee Dr., Nashville, Tenn. 37215

[21] Appl. No.: 09/071,058

[22] Filed: May 1, 1998

[51] Int. Cl.⁷ .................................................. B60B 21/00
[52] U.S. Cl. ............................................................... 301/95
[58] Field of Search .................................. 301/37.22, 95, 301/5.1; 152/203, 510

[56] References Cited

U.S. PATENT DOCUMENTS

| | | | |
|---|---|---|---|
| 2,985,216 | 5/1961 | Williams et al. | 428/40.1 |
| 4,256,159 | 3/1981 | Williams | 428/40.1 |
| 4,318,436 | 3/1982 | Shurman | 301/37.22 X |
| 4,782,596 | 11/1988 | Mieling | 33/208.18 |
| 5,105,308 | 4/1992 | Holley et al. | 301/37.22 X |
| 5,284,263 | 2/1994 | Papciak | 215/230 |

FOREIGN PATENT DOCUMENTS 4003980  8/1990  Germany .

OTHER PUBLICATIONS

Erie Trailer Wheels and Brake Drums Catalog; p. 2, Mar. 1980.

Goodyear Rims and Centrue/Light Wheels Catalog Number TR82–6136, Sep. 1983.

*Primary Examiner*—Russell D. Stormer

[57] ABSTRACT

A method to reduce injury and damage caused by mounting a mis-matched tire of a first size with a rim of a second size, or mounting a mis-matched tire of the second size with a rim of the first size. The method comprising the steps of placing a first color coding on a tire of the first size; and placing a second color coding on a tire of the second size, wherein the second color coding is readily distinguishable from the first color coding. Alternatively, matching markings could be placed both on rims and matching tires, where the tire markings would be place in the interiors of the tires. The markings may also be placed on the tire side walls facing the car hub. Use of a first color, and a second color, where the second color is readily distinguishable from the first color, may be included in the markings. The markings may also include the use of a first pattern, and a second pattern, where the second pattern is sufficiently distinguishable from the first pattern. Both a first and a second color, and a first and a second pattern could be used for the markings, as well. Multiple colors may likewise be used for a first size, or a second, size, or for both sizes.

20 Claims, 4 Drawing Sheets

SAFETY DEVICE AND METHOD FOR REDUCING THE LIKELIHOOD OF TIRE AND RIM MIS-MATCH

BACKGROUND OF THE INVENTION

The present invention relates generally to wheels and more particularly to a safety device to prevent injury when changing tires on wheels. It is especially useful in preventing injuries due to a mis-matched tire and wheel combination when changing tires with a rim holding tire changer.

It will be appreciated by those skilled in the art of designing and manufacturing equipment used to change the tubeless tires mounted on the wheels, or rims, of cars, trucks and other vehicles that if such equipment is not used correctly and in accordance with instruction, tires can explode and create personal injury and property damage. Manufacturers of such equipment have for years attempted to address this problem with instruction, training manuals, warning decals and hands-on training on their equipment in an attempt to prevent hazards associated with improper use of their equipment. However, not withstanding the efforts made by manufacturers of such equipment to warn and train users, shop mechanics often ignore the training and warnings and use the equipment in a manner contrary to the instructions of the manufacturer. Occasionally, when the rim holding tire changers are used improperly, the results can be catastrophic—an exploded tubeless radial tire that can cause severe personal injury and even death.

U.S. Pat. No. 5,623,981 (Cunningham et al.) Safety Barrier For Rim Holding Tire Changers discloses an excellent device to prevent injury due to improper use of a rim holding tire changer. Improper use of equipment, however, is not the only cause of injuries and property damage. Under the best of conditions, a tire of the wrong size is, occasionally, placed on a rim, i.e. the tire and the rim are mis-matched. The resulting explosion, from an operator attempting to seat, or mount, a mis-matched tire, can be severe. Prior art only reduces the effects of the explosion; it does not reduce the likelihood that an explosion will occur. It is believed that this invention will reduce the likelihood of an explosion occurring.

The type of equipment for which Applicant's invention will be particularly useful is known generally in the industry as a rim holding tire changer. Examples of the type of equipment involved are the rim holding tire changers manufactured by Hennessy Industries, Inc., Applicant's assignee, and marketed under the trademarks "COATS®" and "AMMCO®" including the COATS® models 5030A and the model 5060A-E and 5060AX-EX. However, there are many manufacturers of such equipment, including FMC Corporation of Chicago, Ill., Corghi of Correggio, Italy and Sice of Correggio, Italy. Equipment of this type has been readily available in the market for many years, is the subject matter of numerous patents and has been described in a variety of publications, bulletins, brochures, operating and instruction manuals, and the like. One such machine is illustrated in the design patent issued to Applicant as co-inventor in U.S. Pat. No. Design 293,916.

The conditions in a tire changing facility are generally not conducive to accurately determining tire and rim sizes. Competition is fierce in the tire changing industry. Customers want tires changed quickly to reduce the time they must wait for their vehicles during service. Shops want tires changed quickly to increase profits; shops charge per job typically, not per hour. Operators, floor mechanics who change the tires, are driven at a harried pace. This leads, inevitably, to mistakes. Car lifts, moving cars, and other moving equipment and hoses create moving shadows, even with the use of modern lighting fixtures. Moving shadows make it difficult to make a quick determination of tire and wheel sizes. Dirt and grease further reduce the likelihood of accurate determinations of tire and rim sizes. Loud machinery makes concentration difficult as well. These and other factors make quick and accurate determination of tire and wheel sizes difficult, to say the least. Nothing in the prior art aids this determination. Lack of accurate size determination inevitably leads to accidents.

When accidents occur, lawsuits generally follow. Regardless of the efforts of the manufacturers to train users of their equipment in the proper use of rim holding tire changers, teach proper identification procedures, or improve working conditions, the cost of defending such claims can be enormous. In addition, there have been some occasions where damages have been awarded under product liability theories on the basis that the manufacturer of the equipment could have "done more" to protect the user of the equipment against injury.

The particular safety problem involved generally arises during the bead seating step of the tire changing process and in those occasions where there are mis-matched tires and wheels. In the automobile industry in the U.S., practically all rim contours conform to standards established by the Tire and Rim Association, Inc. FIG. 1 illustrates a tire T to be mounted on a rim R. FIG. 2 shows a cross section of a typical rim R, including an upper rim lip 10, a lower rim lip 20, an upper annular hump 30, and a lower annular hump 40. The rim R also, typically, includes a drop center 35, and a rim surface interior 45. The rim surface interior 45 faces outward toward the interior of the tire, and is covered when the tire is mounted on the rim. For ease of description, the upper and lower humps, 30 and 40, will be referred to generally as hump H, and the upper and lower lips, 10 and 20, will be referred to generally as lip L, unless otherwise specified. FIG. 3 shows a cross section of the tire T, including a tire interior, or chamber, 60, and a bead 70.

FIG. 2 also illustrates a typical asymmetrical rim contour for a drop center rim for 13", 14", 15", 16", 17", etceteras diameter tire designations. Symmetrical rim contours are also commonly used in the industry. The annular hump H serves as a safety feature to keep the inner perimeter of the tire from slipping into the drop center of the rim during certain operations of the vehicle. The hump H, which is employed in the majority of modern rim contours, creates a problem in the mounting of a new tire since the bead 70 of the tire T must ride over the hump H and the outside diameter of the hump H is greater than the inside diameter of the tire. To deal with this problem in the tire mounting process, the bead 70 of the tire must first be sealed against the hump H in order to fill the chamber 60 of the tire T with compressed air. As compressed air is injected into the chamber 60, the bead 70 will ride over the hump H and seat against the "j" contour of the perimeter of the rim. After the bead 70 is properly seated, the tire T can be inflated to the recommended pressure and the rim is ready to be attached to the hub of the car.

Danger occurs when the bead 70 binds against the hump H and does not ride over it to seat against the rim lip L. When this happens, contrary to instructions and warnings, mechanics tend to continue to force compressed air into the tire chamber far beyond the recommended pressure of approximately 40 psi for a standard automobile tire. As the pressure within the chamber 60 continues to build up, the mechanic often will peer over the tire to see if the bead 70 has seated against the rim lip L. When the bead 70 actually does ride over the hump H, the pressure within the chamber 60 of the tire can cause the bead 70 to accelerate at a tremendous rate and be impelled against the rim lip L. The force of the bead 70 against the rim lip L can cause the tire T, or the rim R, or both, to explode and if the mechanic is peering over the tire, the explosion occurs in his face and can cause tremendous injury, or even death.

The other occasion which can create the type of problem discussed above is when a mechanic attempts to mount a mis-matched tire/rim combination, i.e. mount the wrong sized tire on a rim.

Automobile tires are generally mounted on even sized wheels of 14", 15", 16", 17", etc. The automobile industry for a number of years used half-sized rims on small trucks such as pick-up trucks. Thus, the trucks would have rim diameters of 16.5", 17.5", etc. In the early 1980's, 16" tires on pick-up trucks became popular and the 16.5" tires lost favor because of extra expense, etc. However, in the older pick-up trucks, the customer would have a 16.5" rim and when he took his pick-up truck to a tire dealer to have a new set of tires mounted on his truck, occasionally a mechanic would pull a 16" tire from inventory and mount a 16" tire on a 16.5" rim (the 16" tire on a 16.5" rim is the predominant problem of mis-matched tires although the problem could occur in other sized rim/tire combinations such as the attempt to mount a 17" tire on a 17.5" rim, etc.).

Some common, or known, mis-matched combinations include the following dimensions: [13 in |365 mm]; [14 in |390 mm]; [14 in |14.5 in]; [15 in |15.5 in]; [16 in |16.5 in]; [17 in |17.5 in]; [19 in–19.5 in]; [22 in |22.5 ; in]; and [24 in |24.5 in]. Note that diameters measured in metric units can easily be mis-matched with diameters measured in inches. Additionally, mis-matches involving diameters such as [16.5 in |17 in] can occur. Possible mis-match combinations are only limited by the operators attentiveness, or lack of attentiveness. For example, a 22 inch diameter could be mis-matched with a 24 inch diameter. Since one cannot predict what possible mis-match combinations will occur, this invention can serve as a warning to prevent other possible mis-matches.

Mounting an even sized tire on a half-sized wheel simply is not possible.

Refer to FIG. 5 which illustrates an even sized tire T on a half-sized rim R.

The bead 70 of a 16" tire T will not seat properly on a 16.5" rim R, or wheel, and continuing to apply compressed air into the chamber 60 of a tire T will eventually result in an explosion of the tire or the tire and the wheel. The enlargement in FIG. 5 shows a 15 degree bead seat, rather than a 5 degree bead seat. If the mechanic is peering over the tire T to see if the bead 70 is properly seated, he will in all likelihood be severely injured. FIG. 6 illustrates a half-sized tire T on and even sized rim R. Again, proper bead 70 seating is not possible, tire explosion, however, is. The enlargement in FIG. 6 shows the gap between the rim interior surface 45 and the tire bead 70.

Prior art lacks a mechanism by which an operator may readily, under typical shop conditions, match a tire size to a rim size. What is needed is a way for an operator to readily distinguish between tires, and rims, of different sizes. After being subjected to noises caused by hammering, air guns, and other machinery, for eight hours in a light deficient and gas fume filled environment. Under the demands of such a fast paced job, an operator needs a clear, simple, conspicuous way to avoid mis-matching tires and rims. The operator needs a measure of safety lacking in the prior art; and the shops would like a way to lower costs associated with exploding tires. Applicant believes the present invention provides a simple and elegant solution to these problems.

SUMMARY OF THE INVENTION

Applicant's invention includes placing a color coding C on the rim R and a matching color coding on the proper sized tire for that rim. In one embodiment, the interior of the rim 45, the part which faces the interior of the tire 60, is color coded, and the interior of the matching tire 60 is color coded with a matching color. The color coding on the tire may also be placed on the side wall of the tire facing the hub of the car. Rim R, and tire T, sizes which may be readily confused would be coded different colors. For instance, a sixteen (16) inch rim R could be color coded white, and a sixteen and one-half (16½) inch rim R could be color coded red. Alternatively, distinctive patterns could be used to code, or mark, the tire and rims to avoid mis-matches. Markings may, of course, include both distinctive colors and patterns. Markings may be multi-colored, i.e. contain multiple colors, as well.

Different markings would allow an operator to distinguish between rim R, or tire T, sizes which may be readily confused. Even after ten hours of changing tires in a noise and fume filled garage, a mind numb operator would still be able to distinguish between a red color coded rim R, or tire T, and a white color coded one. Any distinguishable colors could be used. Additionally, if the rim sizes were not likely to be confused, a color code could be repeated.

Continuing with the example in which the sixteen (16) inch rim is color coded white; white for a twenty-two (22) inch rim, for example, could be used again since a sixteen inch rim would not likely be confused with a twenty-two inch rim. If a smaller rim size, for example, an eighteen (18) inch rim size, were readily distinguishable from a sixteen (16) inch rim size, then, the color used on the sixteen (16) rim could be repeated as well. Mis-matches, however, are limited only by an operator's lack of attentiveness, or distractions to which he is subjected. Possible mis-match candidates should be well distinguished from each other.

The color coding may be applied in any conventional manner, including with paints and laminates and labels and the like. One limitation on the variety of different markings available to color code the rims and tires is that one must be readily able to distinguish between markings placed on sizes which may be easily confused. For example, one should not use two different colors from the same color family, e.g. the blue family, on sizes which may not be readily distinguishable, e.g. distinguishing a sixteen inch rim from a sixteen and one-half inch rim. Continuing with the example, any color readily distinguishable from blue, e.g. orange, would be appropriate on a size generally indistinguishable from the size on which the color code blue is used. Rules for repeating a color within the same family should follow the same rules given previously for repeating the same color: if the size would not be confused, it is acceptable to repeat the color family.

Color coding, as used in this invention, includes coding, or marking with, or without, patterns as well as, or independent of, the use of color to distinguish between rims, or tires, of different sizes. Patterns likely to be used would, typically, include solid, checkered, spotted, striped, and null (i.e. no pattern). Colors likely to be used would, typically, include red, orange, yellow, green, blue, purple, violet, white, black, multiple colors, and null (no color). It should be apparent that any combination of color or pattern markings would be adequate for color coding if the color codings are sufficiently, or readily, distinguishable. Readily distinguishable is defined as being distinguishable enough that an operator can quickly and easily tell that the two color codings are different. If the operator cannot quickly and easily tell that the two color codings are different, then the color codings would not be sufficiently distinguishable to reduce the possibility of tire and rim mis-matches.

An object of this invention is to provide an operator with a way to readily distinguish between tires, and rims, of different sizes. A further object of this invention is to make the method of distinguishing between rim, or tire, sizes conspicuous, simple, and clear, so as to reduce the possibility that an operator may mis-match tires and rims, even after being subjected to noises caused by hammering, air guns, and other machinery for eight hours in a light deficient and gas fume filled environment on a job demanding a fast pace. Another object of this invention is to provide the operator with a measure of safety lacking in the prior art. Yet another object of the invention is to provide a simple way for shops to lower costs associated with exploding tires. Another object of the invention is to increase efficiency and reduce time to change tires because an operator can 'read' these markings quicker than he can read text on a tire or a rim.

DESCRIPTION OF THE PREFERRED EMBODIMENT

Figure 1:
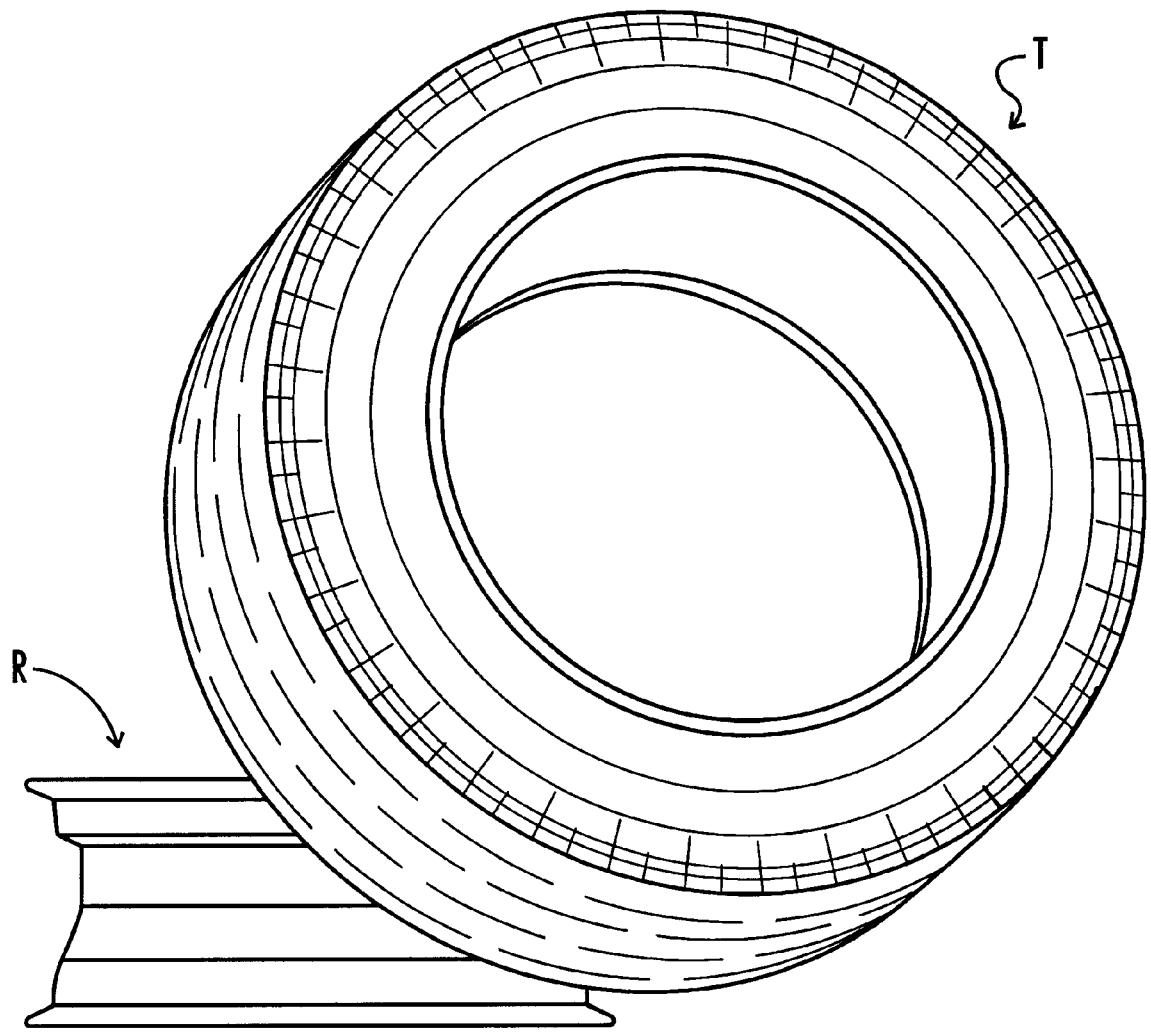
FIG. 1 illustrates a tire to be mounted on a rim

Applicant's invention will be best understood when considered in light of the following description of the preferred embodiment of the invention, as illustrated in the attached drawings wherein like reference numerals refer to like parts.

Figure 2:
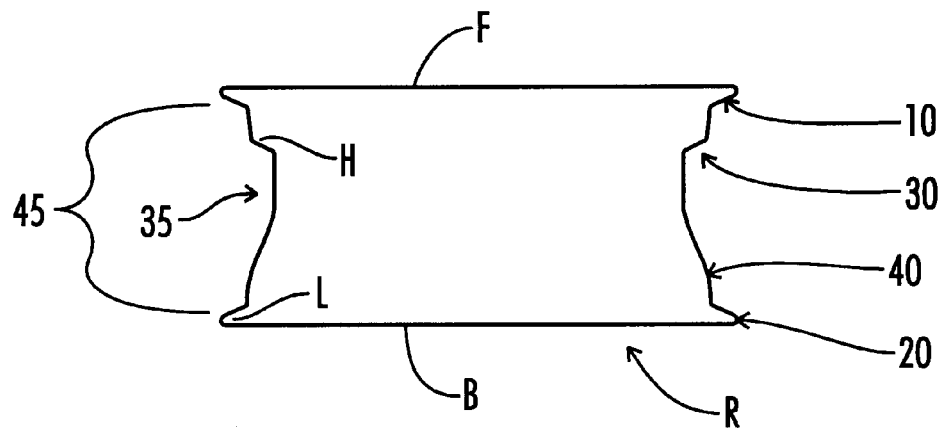
FIG. 2 is a cross section view of a rim.
Figure 3:
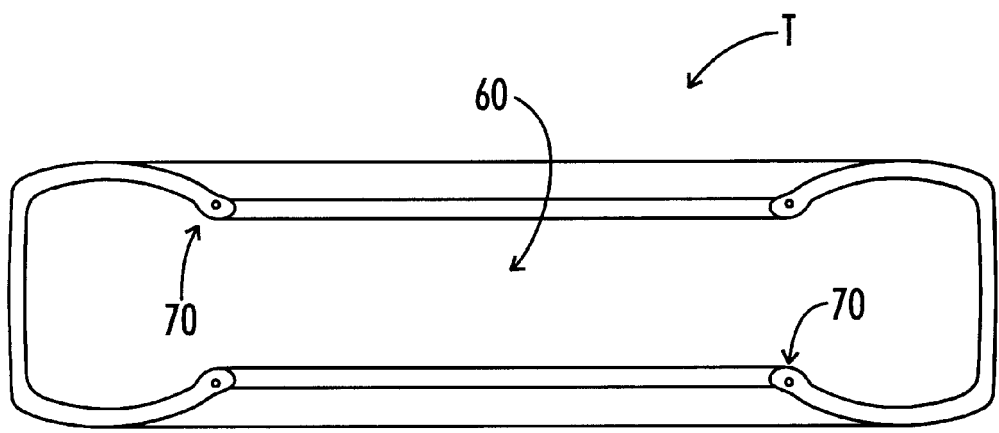
FIG. 3 is a cross section view of a tire.

FIG. 1 illustrates a tire T to be mounted on a rim R. FIG. 2 shows a cross section of a typical rim R, including an upper rim lip 10, a lower rim lip 20, an upper annular hump 30, a lower annular hump 40. The rim R also includes a front surface F, a back surface B, a drop center 35, and a rim surface interior 45. The rim surface interior 45 is the surface of the rim R which faces the interior of a tire when the tire is mounted on the rim. For ease of description, the upper and lower humps, 30 and 40, will be referred to generally as hump H, and the upper and lower lips, 10 and 20, will be referred to generally as lip L, unless otherwise specified. FIG. 3 shows a cross section of the tire T, including a tire interior, or chamber, 60, and a bead 70.

Figure 4:
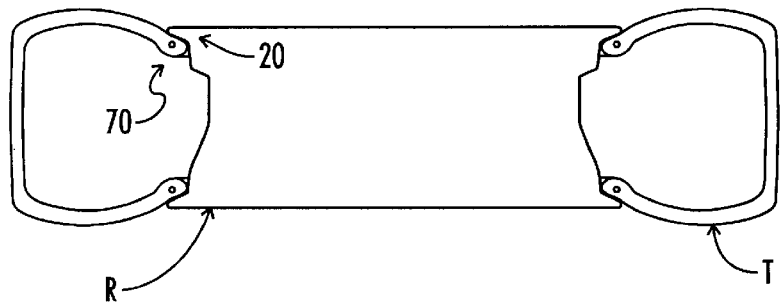
FIG. 4 is a cross section view of a tire mounted on a rim with the bead properly seated.
Figure 5:
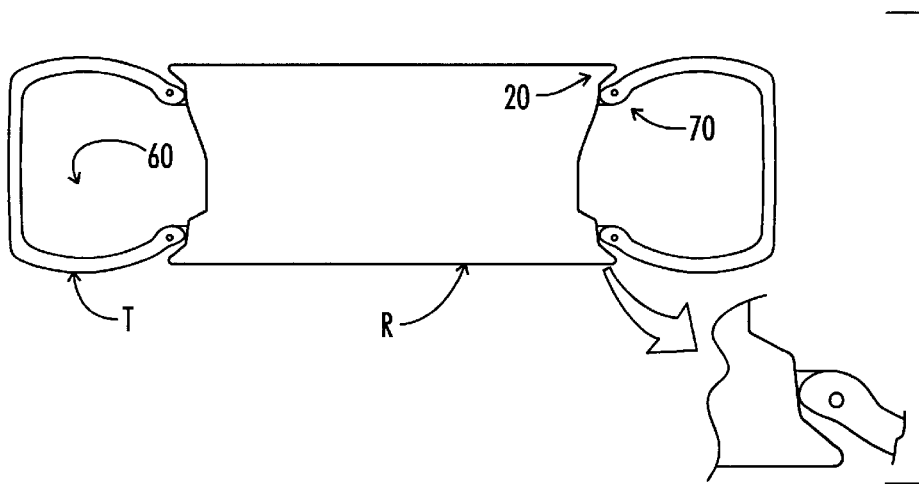
FIG. 5 is a cross section view of an even sized tire mounted on a half-sized rim.
Figure 6:
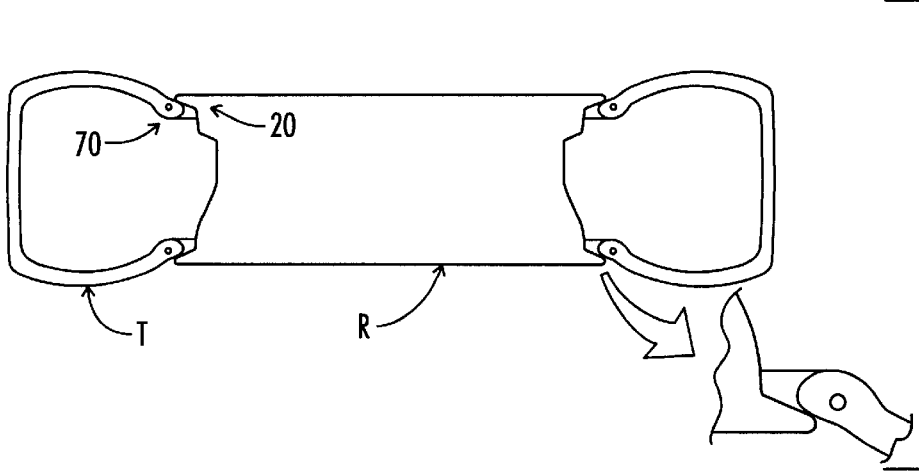
FIG. 6 is a cross section view of a half-sized tire mounted on an even sized rim.

FIG. 4 illustrates a properly mounted tire T on a rim R, with the bead 70 properly seated. FIGS. 5 and 6 show a bead improperly seated. FIG. 5 illustrates an even sized tire T on a half-sized rim R. The blow up in FIG. 5 shows a 15 degree bead seat, rather than a flush bead seat. FIG. 6 illustrates a half-sized tire T on and even sized rim R. The blow up in FIG. 6 shows the gap between the rim interior surface 45 and the tire bead 70.

Figure 7:
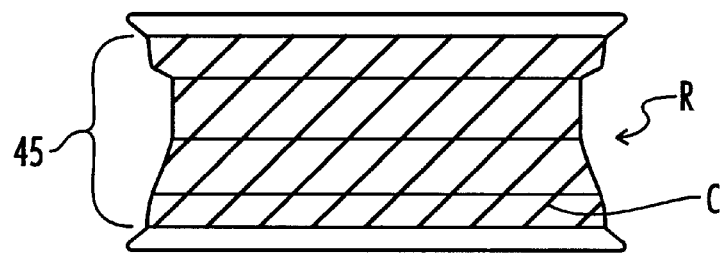
FIG. 7 shows a color coding on the interior surface of a rim.
Figure 8:
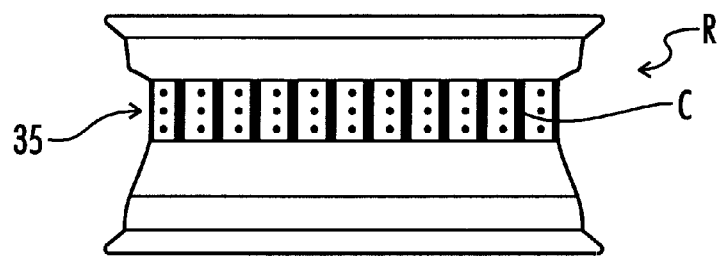
FIG. 8 shows a color coding with a different pattern and color than the one shown in FIG. 7.
Figure 9:
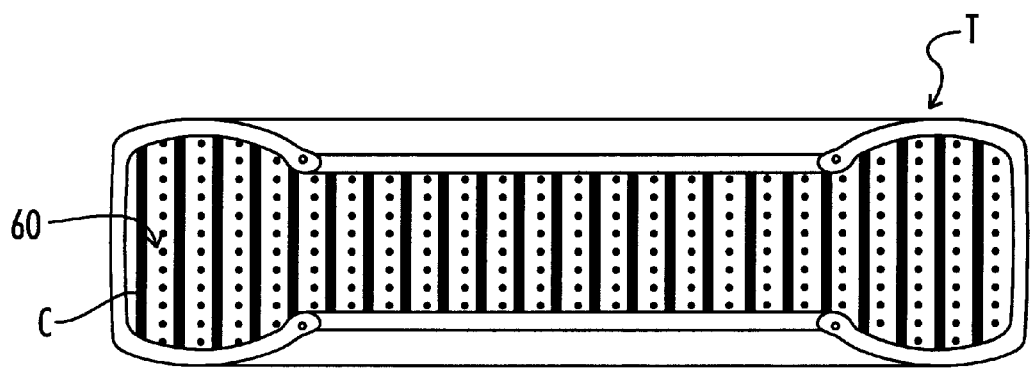
FIG. 9 shows a color coding similar to the color coding used in FIG. 8 applied in the chamber of a tire.

FIG. 7 illustrates the use of a first color coding C on the interior surface 45 of a rim R. As can be seen from FIG. 7, the color coding or marking covers a substantial portion of the interior surface 45 of the rim R. Contrast FIG. 7 with FIG. 8. FIG. 8 illustrates a second color coding sufficiently distinguishable from the first color coding depicted in FIG. 7. The pattern, indicated by stripes, and color, indicated by specks, used in FIG. 8 are both sufficiently different from the pattern, a solid band, and color, indicated by diagonal lines, used in FIG. 7. FIG. 9 uses the same color coding in the tire interior 60 as that used in FIG. 8. Thus an operator could readily tell that the tire of FIG. 9 should be mounted on the rim of FIG. 8, rather than the rim of FIG. 7, because the color codings between the two rims are sufficiently distinguishable. Once again as can be seen from FIGS. 8 and 9, the markings, whether they be colors, patterns or a combination thereof, cover a substantial portion of at least one surface of the rims and tires so as to be glaringly obvious to the most careless worker when a mis-match of tire and rim is about to happen.

In a preferred embodiment, solid patterns are used for even size rims, and striped patterns are used for half-size rims. Preferably, matching codings are applied to the interior of matching tires, as well. Markings on the side wall of the tire which faces the car hub, however, would be as effective. For example, a sixteen inch rim and tire would both have a solid color coding, and a sixteen and one-half inch rim and tire would have a striped color coding.

One color selection could be assigned to a size family, e.g. the sixteen inch size family would include both sixteen inches and sixteen and one-half inches and could be assigned the same color, but different patterns will be used for the different sizes within that size family. In one embodiment of the invention, the color selection assigned to some size families would include assigning blue to fourteen inch rims and tires; orange to fifteen inch rims and tires; white to sixteen inch rims and tires; yellow to seventeen inch rims and tires; and green to eighteen inch rims and tires. These colors were selected because they generally are more visible than other colors. The multitude of colors, shadings, and hues, available today, however, make the choice of colors just described somewhat arbitrary. Only sizes from fourteen to eighteen inches were suggested here because those are the tire sizes most commonly used in the industry.

Although there have been described particular embodiments of the present invention of a new and useful safety device and method for reducing the likelihood of tire and rim mis-match, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. A safety device to prevent mounting mis-matching a tire of a first size on a rim of a second size, or mis-matching a tire of the second size with a rim of the first size, when changing a tire of the first size mounted on a rim of the first size, each tire including a chamber, and each rim including an interior surface, a front surface and a back surface the safety device comprising:

a. a first marking on the rim of the first size; and b. a second marking on the rim of the second size, wherein the second marking is readily distinguishable from the first marking; and c. wherein said markings cover a substantial portion of at least one of said surfaces.

2. The safety device of claim 1, wherein the first marking is located on the interior surface of the rim of the first size.

3. The safety device of claim 2, wherein the first marking is located on a drop center portion of the rim of the first size.

4. The safety device of claim 1, further including marking in the chamber of the tire of the first size, said marking being of substantially the same appearance as the first marking on the rim of the first size.

5. The safety device of claim 1, wherein the first marking includes a first pattern; and the second marking includes a second pattern, wherein the second pattern is readily distinguishable from the first pattern.

6. The safety device of claim 5, wherein the first marking includes a first color, and the second marking includes a second color, wherein the second color is readily distinguishable from the first color.

7. The safety device of claim 1, wherein the first marking includes a first color, and the second marking including a second color, wherein the second color is readily distinguishable from the first color.

8. A method of reducing injury and damage caused by mis-matching a tire of a first size with a rim of a second size, or mis-matching a tire of the second size with a rim of the first size, said tires having chambers, the method comprising the steps of:

a. marking a substantial portion of the chamber of a tire of the first size with a first marking; and b. marking a substantial portion of the chamber of a tire of the second size with a second marking, wherein the second marking is readily distinguishable from the first marking.

9. The method of reducing injury and damage of claim 8, comprising the step of placing a marking substantially identical in appearance to said first marking on a rim of the first size.

10. The method of reducing injury and damage of claim 8, further comprising the steps of using a first pattern with the first marking, and using a second pattern with the second marking, wherein the second pattern is readily distinguishable from the first pattern.

11. The method of reducing injury and damage of claim 10, further comprising the steps of using a first color with the first marking, and using a second color with the second marking, wherein the second color is readily distinguishable from the first color.

12. The method of reducing injury and damage of claim 8, further comprising the steps of using a first color with the first marking, and using a second color with the second marking, wherein the second color is readily distinguishable from the first color.

13. A method of reducing the likelihood that a tire of a first size will be mounted on a rim of a second size, or that a tire of the second size will be mounted on a rim of the first size, thus, providing additional safety to an operator of a rim holding tire changer, and to bystanders, the method of reducing mis-matched mounting comprising the steps of:

a. placing a first marking on a substantial portion of a surface of a rim of the first size;

b. placing a second marking on a substantial portion of a surface of a rim of the second size; wherein the second marking is sufficiently different from the first marking so that the operator can readily distinguish the first marking from the second marking.

14. The method of mis-matched mounting reduction of claim 13, comprising the step of marking a tire of the first size with a marking substantially identical in appearance to the first marking.

15. The method of mis-matched mounting reduction of claim 14, comprising the step of locating the first marking on the surface of the chamber of a tire of the first size.

16. The method of mis-matched mounting reduction of claim 15, comprising the steps of using a first color with the first marking; and using a second color with the second marking, wherein the second color is readily distinguishable from the first color.

17. The method of mis-matched mounting reduction of claim 16, comprising the steps of using a first pattern with the first marking, and using a second pattern with the second marking, wherein the second pattern is readily distinguishable from the first pattern.

18. The method of mis-matched mounting reduction of claim 13, comprising the steps of using a first pattern with the first marking; and using a second pattern with the second marking, wherein the second pattern is readily distinguishable from the first pattern.

19. The method of mis-matched mounting reduction of claim 13, wherein step (b) comprises the step of using multiple colors.

20. The method of mis-matched mounting reduction of claim 13, wherein the first marking is used in conjunction with even sized tire and rim sizes; and the second marking is used in conjunction with half-sized tire and rim sizes.

* * * * *